(No Model.) 2 Sheets—Sheet 1.

J. GARDNER.
BRAKE.

No. 532,048. Patented Jan. 8, 1895.

Witnesses:
C. V. Edwards
Frank S. Ober

Inventor:
John Gardner
by his atty, (No Model.) 2 Sheets—Sheet 2.

J. GARDNER.
BRAKE.

No. 532,048. Patented Jan. 8, 1895.

Witnesses:
C. V. Edwards
Frank S. Ober

Inventor:
John Gardner
by his atty.
Wm. A. Rosenbaum

UNITED STATES PATENT OFFICE.

JOHN GARDNER, OF MANCHESTER, ENGLAND.

BRAKE.

SPECIFICATION forming part of Letters Patent No. 532,048, dated January 8, 1895.

Application filed December 4, 1893. Serial No. 492,674. (No model.) Patented in England August 25, 1893, No. 16,043.

*To all whom it may concern:*

Be it known that I, JOHN GARDNER, a subject of the Queen of the United Kingdom of Great Britain and Ireland, residing at Manchester, in the county of Lancaster, England, have invented certain new and useful Improvements in Brakes, (for which I have obtained a patent in Great Britain, No. 16,043, dated August 25, 1893,) of which the following is a specification.

This invention relates to brakes for directly driven mechanisms and its object is to bring the brake into action automatically upon the sudden stopping, slowing or reversal of the driving mechanism or device.

According to my improvements the driven wheel or pulley or one of the driven wheels or pulleys of the mechanism is constructed with its rim and its central part capable of a certain amount of rotary motion independently of each other. Concentric with this wheel or pulley there is arranged a fixed brake drum around which a brake strap is fitted. One end of this brake strap is secured to the rim of the wheel or pulley and the other end to its central part. Stops or projections are formed within the rim with which the central part can engage in such a manner that the rim is driven by the central part or vice versa by means of the stops when rotating in the required direction. When however the driving device is suddenly slowed, stopped or reversed the one part of the wheel or pulley will over-run the other part and thus cause the approach together of the two ends of the brake strap and thus cause the automatic application of the brake.

The accompanying drawings illustrate in what manner my invention may be carried into practical effect and are hereinafter referred to.

In each of the figures similar parts are denoted by similar letters of reference.

Figure 2:
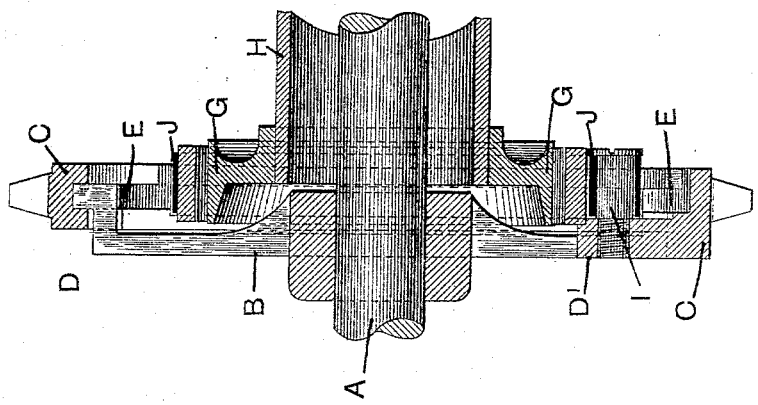
Figure 1:
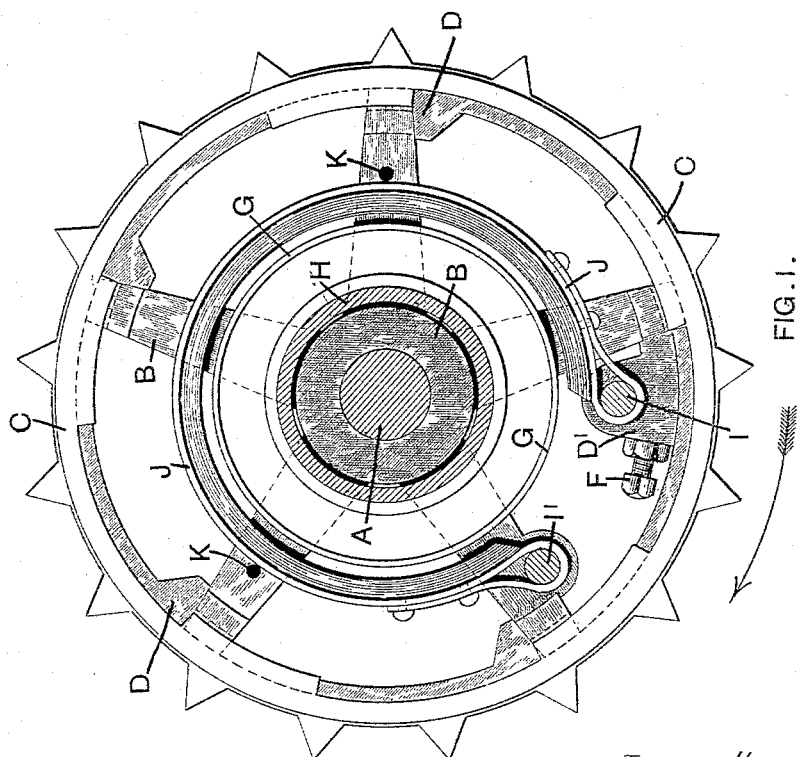
Figure 4:
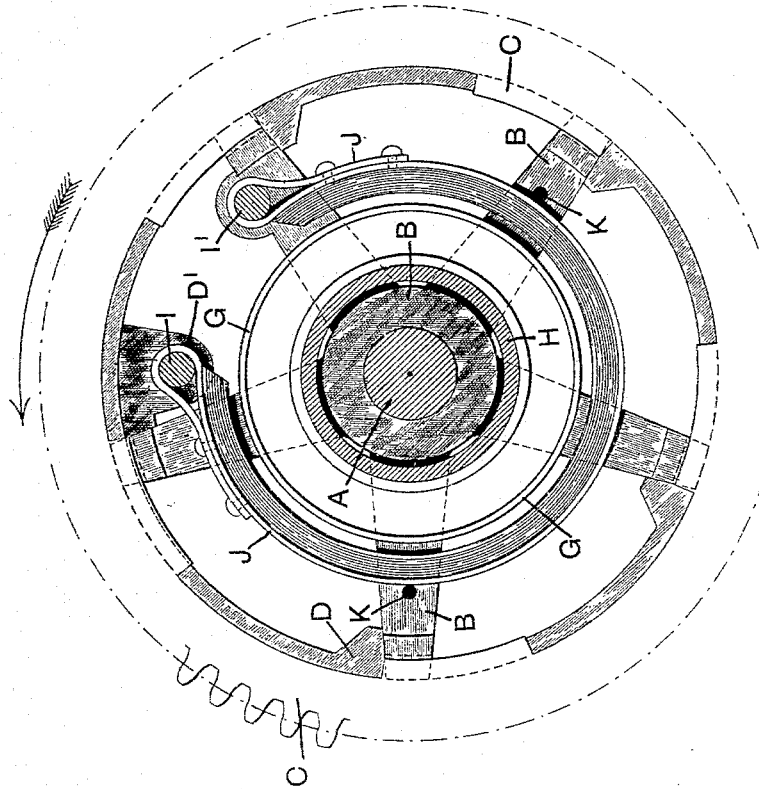
Figure 3:
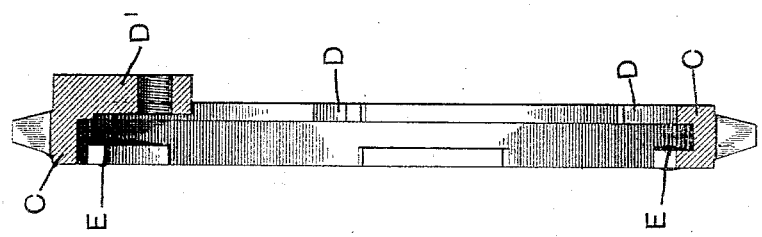

Figure 1 represents in sectional elevation, and Fig. 2 in transverse section, the application of my improved apparatus to mechanism driven from an axis, the particular case being the chain wheel of a velocipede. Fig. 3 is a section of the rim only of the wheel represented in Figs. 1 and 2. Fig. 4 is a view corresponding in all respects with Fig. 1 but representing the apparatus as arranged when driven from the rim of the wheel or pulley.

In Figs. 1 and 4 the arrows show the direction of rotation of the wheel or pulley in ordinary work.

A is the axle upon which the spokes B or the equivalent central part of the wheel or pulley is fixed.

C is the rim of the wheel on the inner periphery of which are formed the projections D, each of which is arranged to come into contact with the end of one of the spokes or a projection therefrom or a corresponding projection from the center part B. Various means may be employed for insuring the connection between the rim and the center part B while still permitting the necessary amount of independent concentric motion for each. As shown by the drawings, the inner periphery of the rim C has a channel E formed in it, a part of which is opened by cutting away one side of the channel between each pair of projections D, to permit the insertion of the ends of the spokes or the projections therefrom into the channel. To prevent the accidental separation of the rim and center part in work, an adjustable and removable screw F may be inserted into the projection D' which projects from the plane of the rim sufficiently for this purpose, as shown by Fig. 3. When this screw is adjusted in position it will prevent the angular motion of the center part and rim relatively to each other to such an extent that the center part or its projections cannot leave the channel E through the cut-away parts.

G is the brake drum which is fixed and concentric with the axle A. As shown by the drawings, the brake drum is mounted upon the end of a tube H which may be fixed upon any suitable part of the framing of the mechanism to which my apparatus is to be applied. This part must have sufficient strength to resist the torsional strains to which it will be subjected in use.

Upon the rim projection D' there is a short stud I, and upon the preceding projection of the center part, Fig. 1, or the following projection, Fig. 4, there is a similar stud I', and the opposite ends of the brake strap J are secured respectively upon these studs as shown.

The normal direction of rotation is indicated in each case by an arrow. Taking first Fig. 1, which represents the driving wheel of an ordinary "safety bicycle" the power is applied through the pedals to the axle A from which it is transmitted through the center part B to the projections D D' and thus to the rim, which is thereby rotated. Now, if in descending a hill or otherwise, the machine should commence to travel faster than is prudent, the driver back-pedals, or resists with his feet the motion of the pedals. The immediate effect of this action is to tend to make the center part travel more slowly than the rim. The ends of the brake strap consequently approach each other and the brake is thus automatically applied.

It is preferred to make the metallic part of the brake strap, which may be constructed in the usual manner, of spring steel, or alternatively to insert a spring between its ends, the tendency of the spring in either case being to keep the brake normally open. It follows therefore that by merely ceasing to drive, as when the driver rests his legs, the brake is not applied, and never comes into action until the spring is compressed, and this can only be done by a deliberate effort of the rider.

Taking now the case of power applied through the rim of the wheel or pulley, as shown by Fig. 4, the rim drives the center part and the axle through the projections D D' so long as the power is uniformly applied. As soon, however, as there is a reduction in the driving speed or a cessation of the driving action, the mechanism runs faster than the rim for an instant, bringing the ends of the brake strap together and thus applying the brake as described with reference to Fig. 1. So soon as the normal rate of speed in the rim is recovered or the rim travels for an instant faster than the center part, the brake is automatically removed.

To prevent distortion or buckling of the brake strap, the limiting pins K K may be fixed in the center part.

It will be evident that in the case of a bicycle the brake might be fixed in the gear wheel on the back or driving wheel instead of near to the crank axle bearing.

If it be desired to make precaution against the presence of an excess of oil between the brake drum and brake strap, the periphery of the drum may have small transverse channels formed in it for the escape of the lubricant.

Having now particularly described and ascertained the nature of my said invention, I declare that what I claim is—

1. A brake mechanism consisting of a fixed brake drum and a center part fixed upon an axle, a rim constructed to engage with and move for a certain distance independently of the center part, and a brake strap one end of which is connected with the rim and the other end with the center part.

2. In a brake mechanism, the combination of a rim and a center part capable of angular motion through a short distance relatively to each other, a fixed brake drum, and a brake strap connected at one end to the rim and at the other end to the center part, substantially as described.

In testimony that I claim the foregoing as my invention I have signed my name, in presence of two witnesses, this 17th day of November, 1893.

JOHN GARDNER.

Witnesses:
GEO. HEYS,
ARTHUR H. PULMAN.